United States Patent [19]
Robinson

[11] 3,786,992
[45] Jan. 22, 1974

[54] VARIABLE AREA NOZZLE FOR A GAS TURBINE ENGINE

[75] Inventor: Norman Robert Robinson, Duffield, England

[73] Assignee: Rolls-Royce (1971) Limited, London, England

[22] Filed: May 31, 1972

[21] Appl. No.: 258,378

[30] Foreign Application Priority Data
June 11, 1971  Great Britain..................... 27417/71

[52] U.S. Cl. ......................................... 239/265.39
[51] Int. Cl. .......................................... B64c 15/06
[58] Field of Search................... 239/265.39, 265.41

[56] References Cited
UNITED STATES PATENTS

| | | | |
|---|---|---|---|
| 2,934,890 | 5/1960 | Odegaard...................... | 239/265.41 |
| 2,796,731 | 6/1957 | Morley et al. ............. | 239/265.39 X |
| 3,662,957 | 5/1972 | Pinto et al. .................... | 239/265.39 |
| 3,685,738 | 8/1972 | Leibach et al................. | 239/265.39 |

Primary Examiner—M. Henson Wood, Jr.
Assistant Examiner—John J. Love
Attorney, Agent, or Firm—Cushman, Darby & Cushman

[57] ABSTRACT

A variable area nozzle for a gas turbine engine comprises an annular array of primary flap members pivoted at their upstream ends for movement of their downstream ends towards or away from the axis of the array. The primary flap members are provided with roller tracks which co-operate with roller tracks of adjacent primary flap members to define tapered roller trackways. Rollers are positioned in the roller trackways such that relative axial movement between the rollers and roller trackways urges the downstream ends of the primary flap members towards or away from the axis of the array.

10 Claims, 4 Drawing Figures

VARIABLE AREA NOZZLE FOR A GAS TURBINE ENGINE

This invention relates to a variable area nozzle for a gas turbine engine.

According to the present invention, a variable area nozzle for a gas turbine engine comprises an annular array of primary flap members pivoted at one end for movement of their other ends towards or away from the axis of said array, said primary flap members being provided with roller tracks which co-operate with roller tracks of adjacent primary flap members to define tapered roller trackways, roller means positioned in said tapered roller trackways and means for effecting relative axial movements between said roller means and said tapered roller trackways such as to cause the said other ends of said primary flap members to be urged towards or away from the axis of said array.

Said primary flap members may be urged towards the axis of said array in opposition to the pressure of the gas flowing through said nozzle, or permitted to move further from the axis of said array under the influence of said pressure of gas.

Said primary flap members may be pivotally connected at their upstream ends to an axially translatable shroud member.

Said shroud member may be conveniently actuated by a plurality of pneumatic or hydraulic rams.

Said roller means may comprise a plurality of rollers mounted at the downstream end of an axially disposed elongate arm member the upstream end of which is pivotally connected to the jet pipe of said gas turbine engine.

Four parallel rollers may be mounted at the downstream end of said arm member such that their centres define a trapezium, the non-parallel sides of which correspond with the taper on said tapered roller trackway.

Preferably the two upstream rollers are in peripheral contact with each other, with said roller trackway and with the two downstream rollers.

Said roller tracks may be mounted on axially extending and radially disposed surfaces on said primary flap members by way of extension members such that each said roller track faces the axially extending and radially disposed surface of the primary flap member to which it is attached.

Secondary flap members may be interposed in overlapping relationship between said primary flap members.

The upstream ends of said primary and secondary flap members are preferably in sliding engagement with the downstream end of said jet pipe so as to provide a gas-tight seal therewith.

Said primary and secondary flap members may be shaped so as to define a convergent-divergent type nozzle.

Said primary flap members may each have a primary outer flap member fixedly located on its radially outer surface.

Secondary outer flap members may be interposed in overlapping relationship between said primary outer flap members.

Said secondary outer flap members may each be pivotally mounted by their downstream ends to the downstream ends of said secondary flap members, said secondary outer flap members extending across the radially outer surface of said secondary flap members and in overlapping relationship with said primary outer flap members.

The invention is illustrated, merely by way of example, with reference to the accompanying drawings in which.

Figure 1:
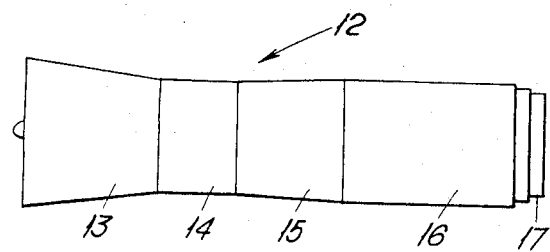
FIG. 1 is a side elevation of a gas turbine engine provided with a variable area nozzle according to the present invention.

With reference to FIG. 1, there is shown a gas turbine engine 12 provided with, in axial flow series, compressor means 13, combustion means 14 turbine means 15, afterburner 16 and variable area nozzle 17.

Figure 2:
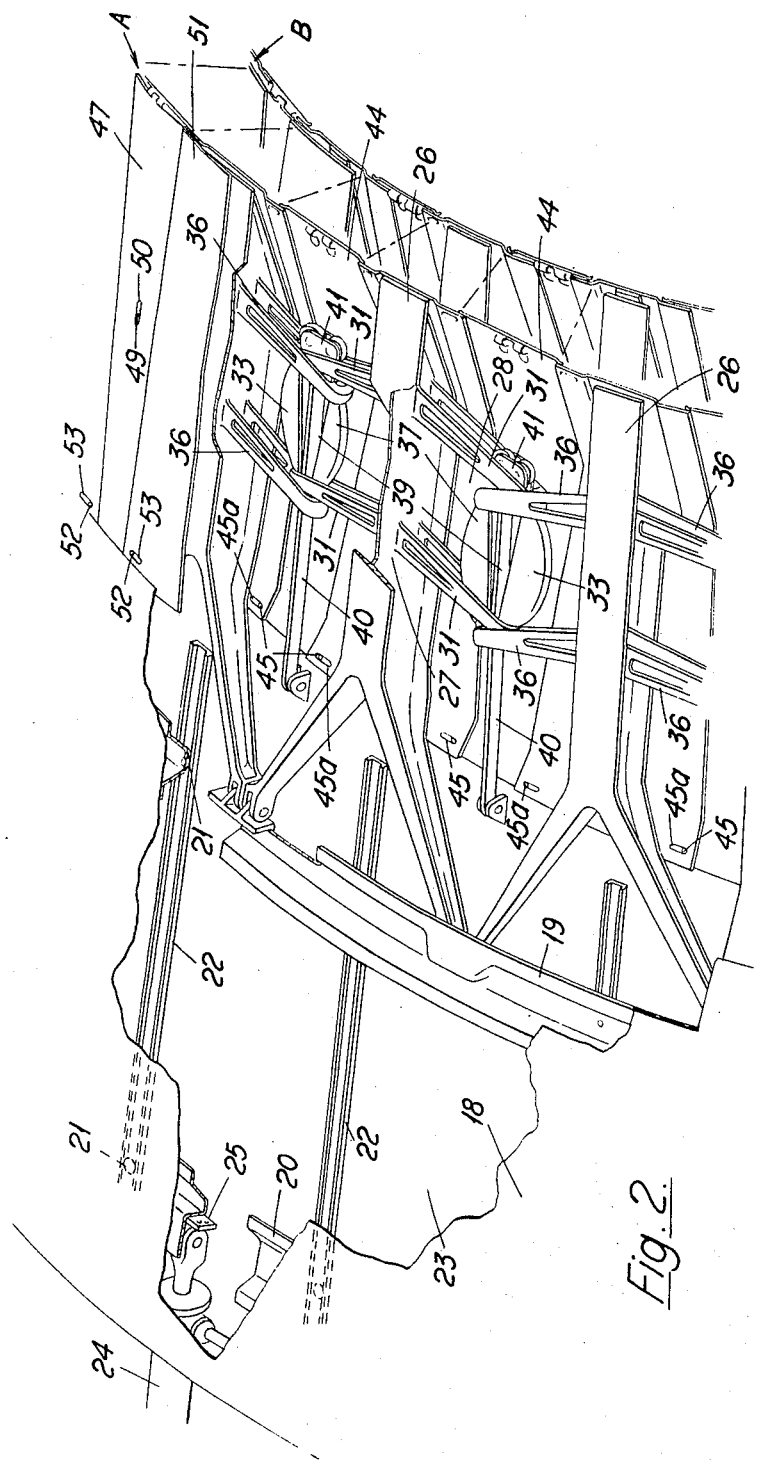
FIG. 2 is a partly sectioned view of a variable area nozzle according to the present invention showing the operation mechanism thereof.

The construction of nozzle 17 can be more easily seen in FIG. 2. Shroud member 18 is provided on its radially inner surface with two annular axially spaced apart support channels 19 and 20. Channels 19 and 20 are each provided on their radially inner surfaces with a plurality of equally spaced apart bearings 21. Bearings 21 are in turn slidingly located in axially disposed correspondingly spaced apart bearing tracks 22 mounted on the radially outer surface of jet pipe 23. Thus shroud member 18 is axially translatable over the radially outer surface of jet pipe 23.

Shroud member 18 is actuated by an annular array of twelve equally spaced apart axially disposed pneumatic rams 24. The downstream end of each ram 24 is pivotally connected to a support plate 25 which is fixedly connected to the axially upstream annular support channel 20. The upstream end of each ram 24 is pivotally connected to the jet pipe 23.

A plurality of actuating frames 26 are pivotally connected by way of their bifurcated axially upstream ends to the axially downstream annular support channel 19. Each actuating frame 26 is of substantially H-shape cross-section, the web 27 interposed between the flanges of the unbifurcated portion thereof being axially extending and radially disposed with respect to the axis of the engine 12.

The radially inner flange of each actuating frame 26 corresponds in shape with each primary flap 28 fixedly attached thereto. Each primary flap 28 is trapezium-shaped and is positioned on each actuating frame 26 such that its non-parallel sides extend axially and that the longer of its parallel sides is disposed upstream of the shorter. The non-parallel sides may be curved.

Figure 3:
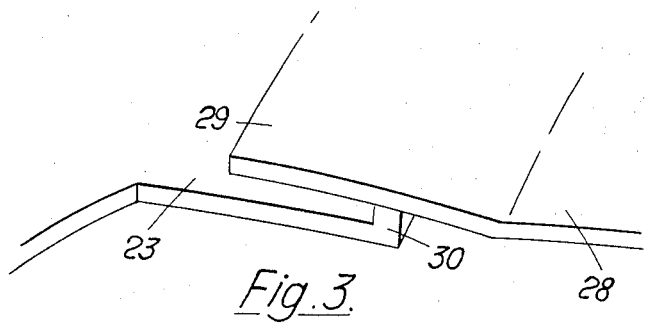
FIG. 3 is an enlarged sectional view of a seal between certain of the flaps of the nozzle of FIG. 2.

The axially upstream portion 29 of each primary flap 28, which can be more easily seen in FIG. 3, is upturned away from the axis of the engine 12. The upturned portion 29 is slidingly located on a lip 30 formed on the axially downstream edge of jet pipe 23. The amount that portion 29 is upturned is selected such that portion 29 is in sealing engagement with lip 30 throughout all the operating positions of flaps 28.

The axially downstream end of each primary flap 28 is also upturned away from the engine axis such that in operation, the longitudinal profile each flap 28 is essentially convergent-divergent.

Alternate actuating frames 26 are provided on each axially extending face of web 27 with two axially spaced apart substantially transversely extending extension members 31. Each extension member 31 is substantially U-shaped such that the arms thereof are spaced apart and parallel.

The free ends of the arms of extension members 31 are attached to webs 27 such that the arms are angled in a generally upstream direction and are superposed relative to the axis of the engine 12.

Figure 4:
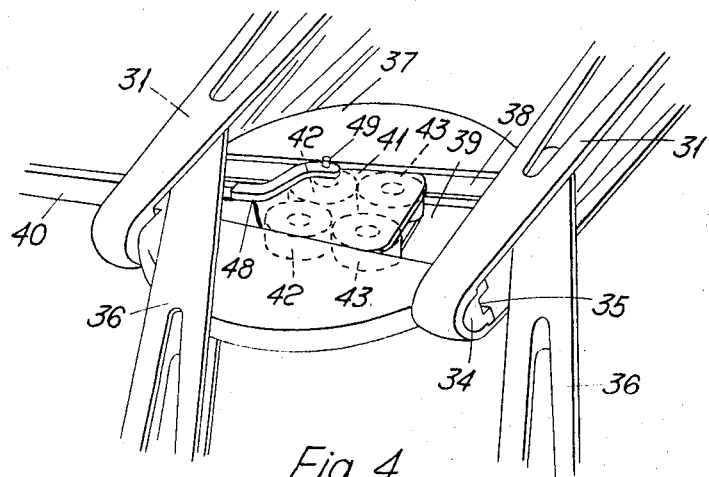
FIG. 4 is an enlarged view of the mechanism which operates the nozzle of FIG. 2.

The ends of each pair of extension members 31 which are remote from web 27 are connected by a beam member 33. Each member 33, one of which can be more easily seen in FIG. 4, is provided at each end with an extended portion 34. Extension portions 34 locate within the ends of corresponding extension members 31, the engaging surfaces being part cylindrical or spherical.

Each beam member 33 is positioned on extension members 31 such that its face opposing the web 27 to which the members 31 are attached forms a roller track 35 which is substantially perpendicular to members 31.

The remaining actuating frames 26 are provided on each face of web 27 with two axially spaced apart extension members 36. Extension members 36 are similar to extension members 31 differing only in that the arms of members 36 are sufficiently spaced apart to allow the passage of members 31 and 33 therebetween. The ends of each pair of extension members 36 which are remote from web 27 are connected by a beam member 37 which is similar to that interconnecting extension members 31 and which is also positioned similarly.

As with member 33, member 37 also carries a roller track 38. All tracks may be lipped as shown at 35 to locate engaging rollers in the direction parallel to the roller axes.

Extension members 31 and 36 are of sufficient length and are positioned on webs 27 so as to allow members 33 and 37 to co-operate such that their respective roller tracks 35 and 38 define a single tapered roller trackway, 39. The taper on roller trackway 39 is arranged such that the upstream end thereof is narrower than the downstream end.

An annular array of actuating arms 40, each having a roller assembly 41 located on their downstream ends, are pivotally connected at their upstream ends to the downstream end of jet pipe 23. Each roller assembly 41, one of which can be more easily seen in FIG. 4, consists of four parallel rollers positioned in pairs.

The pair of primary rollers 42 which engage with the tapered trackway 39, and also roll upon each other, are loosely mounted on shafts upstream of the pair of secondary rollers, 43. The secondary rollers 43 have no contact with one another, or the trackway 39, and their shafts are fixed relative to the corresponding actuating arm 40. Secondary rollers 43 thus prevent the corresponding pair of primary rollers 42 from moving downstream under the influence of the tapered roller tracking 39, by being in rolling contact therewith. The rollers 42 and 43 are arranged such that the longitudinal taper defined by the roller axes corresponds in sense with the longitudinal taper of each roller trackway 39.

Arms 40 are positioned on jet pipe 23 such that a roller assembly 41 is located in each tapered roller trackway 39. Roller assemblies 41 are positioned in each roller trackway 39 such that relative axial movement between them results in members 33 and 37 being urged apart or permitted to move together. It will be seen therefore that as members 33 and 37 are urged apart or permitted to move together, then actuating frames 26 will be correspondingly pivoted towards or permitted to pivot away from the axis of the engine 12.

The axially extending edges of primary flaps 28 are outwardly joggled so as to receive the axially extending edges of the secondary flaps 44 which are interposed therebetween. The longitudinal profile of each of secondary flaps 44 is similar to that of each of primary flaps 26, such that flaps 26 and 44 together define a substantially continuous annular convergent-divergent nozzle.

The upstream portions of secondary flaps 44 are slidingly located on the downstream end of jet pipe 23 in the same way primary flaps 28 are located thereon. The primary and secondary flaps 26 and 44 thus move together in an axial sense.

The upstream ends of primary flaps 28 and secondary flaps 44 are interconnected by a peg and slot arrangement. Two transversely spaced apart pegs 45 are mounted on the upstream end of each secondary flap 44.

Each peg 45 is located in a corresponding transversely extending slot 45a in the axially upstream end of primary flaps 28.

The downstream end of each secondary flap 44 is pivotally connected by means of a hinge 46 to a secondary outer flap 47. Flap 47 is supported at its mid point by a spring 48 which is fixedly located on the radially outer edge of the downstream end of arm 40. Spring 48 is provided on its radially outer edge with a radially extending peg 49 which in turn locates in a longitudinally extending slot 50 in the secondary outer flap 47. The downstream ends of secondary outer flaps 47 are urged by springs 48 into sliding engagement with the radially inwardly facing edge of the downstream end of shroud 18.

The radially outer flanges of each actuating frame 26 are provided with an outer primary flap 51 fixedly attached thereto. Each outer primary flap 51 is trapezium-shaped and arranged such that the non-parallel edges thereof are longitudinally extending and may actually be curved and the longer of the parallel edges is upstream of the shorter. The radially inner surface of the longitudinally extending edges of each primary outer flap 51 are in overlapping and sliding engagement with the radially outer surfaces of the longitudinally extending edges of the secondary outer flaps 47. The axially upstream edges of the outer primary flaps 51 are slidingly located on the radially inwardly facing edge of the downstream end of shroud 18. The radially outer upstream edge of each secondary flap 47 is provided with two transversely spaced apart radially extending pegs 52. Pegs 52 are each located in correspondingly transversely extending slots 53 in the upstream edges of primary outer flaps 44.

Gaps may be present between the downstream edges of primary outer flaps 51 and primary inner flaps 28 in order to permit the flow of cooling air between the jet pipe 23 and shroud 18 and through the flap actuating mechanism into the jet efflux.

Under conditions of afterburning, it is often desirable to have a large area jet nozzle of low convergence and high divergence. This condition is fulfilled by the present nozzle when in the position indicated by A. During non-afterburning conditions, however, it is often desirable to have a jet pipe nozzle of lesser area which has a high convergence and low divergence. This condition is fulfilled by the present nozzle in the position indicated by B.

It will be appreciated that during engine operating conditions, the jet efflux from nozzle 17 will tend to urge flaps 28 and 44, and consequently actuating frames 26, radially outwards. As frames 26 pivot radially outwardly it will be seen that members 33 and 37 will be drawn together. Thus as members 33 and 37 are separated by roller assemblies 41, and the roller trackway 39 defined by members 33 and 37 are tapered, the relative positions of roller assemblies 41 and members 33 and 37 will dictate the pivotal positions of flaps 28 and 44 and thus the area of nozzle 17.

Relative motion between roller assemblies 41 and members 33 and 37 is effected by the axial translation of shroud 18. Thus conversion of nozzle 17 from position A to position B is achieved by translating shroud 18 in an axially downstream direction. Members 33 and 37 are correspondingly translated in an axially downstream direction and are thus urged apart by roller assemblies 41 resulting in actuating frames 26 and the flaps attached thereto pivoting to position B.

Reversion to position A is achieved by performing the reverse of the aforementioned procedure.

Actuating frames 26 are constrained by means not shown such that when actuated, all parts of the nozzle have substantially the same motion whether or not gas pressure from the jet efflux is present. Thus the rollers in roller assemblies 41 can at most have only small clearances from trackways 39 during all operation positions.

I claim:

1. Variable area nozzle for a gas turbine engine comprising an annular array of primary flap members pivoted at one end for pivotal movement of their opposite ends towards or away from the central axis of said array, said primary flap members being provided with roller tracks which co-operate with roller tracks of adjacent primary flap members to define tapered roller trackways, roller means being positioned in said tapered roller trackways and means being provided for effecting relative axial movement between said roller means and said tapered roller trackways such as to cause the said opposite ends of said primary flap members to be urged towards or away from the axis of said array wherein the improvement comprises said roller means comprising four parallel rollers mounted such that their centres define a trapezium, the non-parallel sides of which substantially correspond with the taper on said roller trackway, and such that the two upstream rollers are in peripheral contact with each other, with said roller trackway and in peripheral contact with the two downstream rollers.

2. A variable area nozzle as claimed in claim 1 wherein said primary flap members are pivotally connected at their upstream ends to an axially translatable shroud member, and said rollers are mounted at the downstream end of an axially elongate arm member, the upstream end of which arm member is pivotally connected to the jet pipe of said gas turbine engine.

3. A variable area nozzle as claimed in claim 1 characterised in that said roller tracks are mounted on axially extending and radially disposed surfaces on said primary flap members by way of extension members such that each roller track faces the axially extending and radially disposed surface of the primary flap member to which it is attached.

4. A variable area nozzle as claimed in 1 wherein secondary flap members are interposed in overlapping relationship between said primary flap members.

5. A variable area nozzle as claimed in claim 4 wherein the upstream ends of said primary and secondary flap members are in sliding engagement with the downstream end of said jet pipe so as to provide a gas-tight seal therewith.

6. A variable area nozzle as claimed in claim 4 wherein said primary and secondary flap members are shaped so as to define a convergent-divergent type of nozzle.

7. A variable area nozzle as claimed in claim 1 wherein each of said primary flap members has a primary outer flap member fixedly located on its radially outer surface.

8. A variable area nozzle as claimed in claim 7 wherein secondary outer flap members are interposed in overlapping relationship between said primary outer flap members.

9. A variable area nozzle as claimed in claim 8 wherein said secondary outer flap members are pivotally mounted by their downstream ends to the downstream ends of said secondary flap members.

10. A variable area nozzle as claimed in claim 9 characterised in that secondary outer flap members extend across the radially outer surface of said secondary flap members and in overlapping relationship with said primary outer flap members.

* * * * *